E. H. MATTINGLEY
RAILWAY CAR
Filed Dec. 27, 1926
Re. 17,778
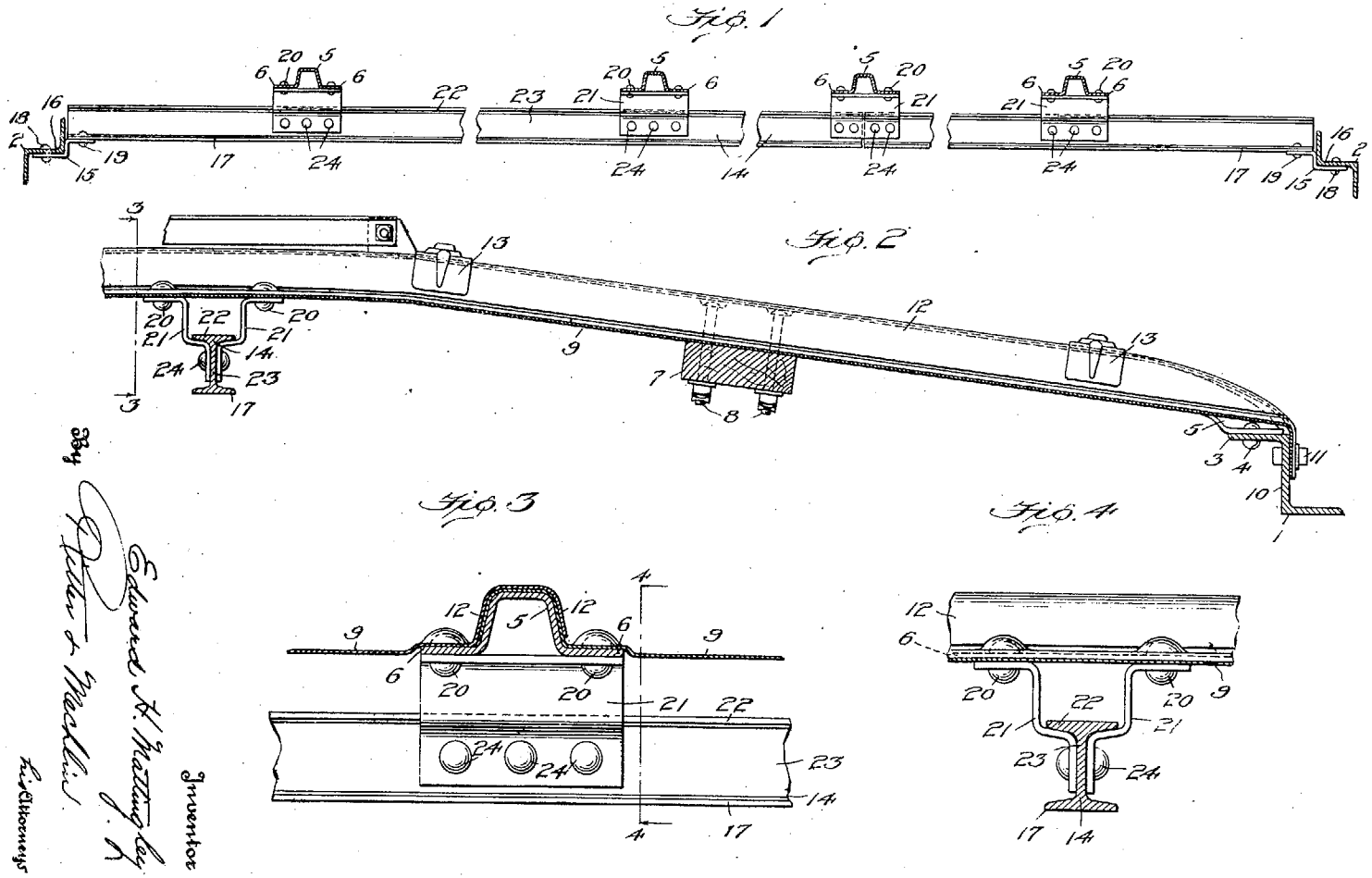
Inventor
Edward H. Mattingley
By Pitter & Macklin
his Attorneys Reissued Aug. 26, 1930

Re. 17,778

REISSUED

UNITED STATES PATENT OFFICE

EDWARD H. MATTINGLEY, OF CHICAGO, ILLINOIS, ASSIGNOR TO CHICAGO-CLEVELAND CAR ROOFING COMPANY, OF CHICAGO, ILLINOIS, A CORPORATION OF DELAWARE

RAILWAY CAR

Original No. 1,694,424, dated December 11, 1928, Serial No. 157,227, filed December 27, 1926. Application for reissue filed July 3, 1930. Serial No. 465,774.

My invention relates to railway cars and more particularly to a load lifting device or beam which is associated with the car roof structure.

A principal object of the invention is to provide means extending longitudinally of the car and rigidly secured to the roof thereof for enabling automobiles to be raised above the car floor so as to permit a platform, rack or similar support, by which the automobile is carried during transit, to be placed thereunder. A still further object of the invention is to secure the load lifting device to the roof in such a manner as to serve as means for reinforcing the upper portion of the car and its roof.

A primary feature of the invention consists in securing the load lifting device in spaced relation to the underside of the car roofing so as to permit a chain or hoisting device to be readily positioned between the roofing and the device to be supported by the latter.

A further feature of the invention resides in rigidly connecting the load lifting device to the carlines in spaced relation to the underside of the car roofing whereby the individual carlines are strengthened and the roof structure as a whole is reinforced.

A still further feature of the invention consists in providing a plurality of means for rigidly connecting the load lifting device to the carlines in spaced relation to the latter and to the underside of the car roofing.

Other and more specific objects and features of the invention will hereinafter appear and be pointed out in the claims.

In the accompanying drawings illustrating a preferred embodiment of the invention:

Figure 1 is a longitudinal sectional view of a car roof, the sheets thereof being removed.

Figure 2 is a fragmentary transverse sectional view of the roof.

Figure 3 is a view taken on line 3—3, Figure 2.

Figure 4 is a view taken on line 4—4, Figure 3.

Referring more particularly to the drawings, the roof is shown as having the usual rigidly connected side plates 1 and end plates 2, both of which may conveniently be of Z-shape. Resting upon the upper horizontal flanges 3 of the side plates and secured thereto by means of rivets 4 are carlines 5 which are preferably of inverted channel shape having oppositely disposed laterally extending flanges 6. If desired, the roof may be provided with purlins 7 which may be advantageously secured to the carlines by bolts 8. The roof sheets 9 are secured to the upstanding intermediate legs 10 of the side plates 1 by bolts 11 and preferably extend continuously from one side plate to the other. The side edges of the sheets preferably terminate in inverted channels 12 of substantially the same shape as the carlines whereby adjacent roof sheets may be arranged on the latter in embracing overlapped relation and secured thereto by means of wedge clamps 13.

The load lifting device or beam 14, illustrated in the present instance as an I-beam, is rigidly connected to the roof structure at its opposite ends by means of brackets 15. Each of these brackets is secured to the horizontal flange 16 of the adjacent end plate and to the lower or bottom flange 17 of the I-beam by rivets 18 and 19, respectively. Extending transversely of each of the carlines and secured to the lateral flanges 6 thereof by rivets 20 are a plurality of angularly shaped brackets 21 for supporting the lifting device intermediate its ends. These brackets are preferably arranged in pairs and each is formed with a portion extending beneath the upper flange 22 of the I-beam and with a portion rigidly connected to the vertical web 23 of the latter by rivets 24. By thus forming the brackets, means is provided for effectively supporting the load lifting device in spaced relation to adjacent portions of the roof so that a chain, rope, hoisting hook or the like may be readily inserted between the roof and lifting device and be supported by the latter.

Being connected at its opposite ends to the end plates 2 and being attached to the carlines 5 at points intermediate its ends, the beam 14, in addition to functioning as a load lifting device, serves to resist any force applied near the top of the car tending to knock out its ends, such force being transmitted by the beam to the several carlines. Moreover, because of this relationship of the parts vertical deflection of any carline is resisted by the beam 14 since forces tending to cause deflection will be transmitted by the latter to adjacent carlines. In this manner the beams and carlines cooperate to insure a most rigid roof construction. Furthermore, as the load lifting device is rigidly connected to the carlines in such manner as to form therewith structures of box-like section, the individual carlines are prevented from spreading and thereby materially strengthened.

It will be observed that the load lifting beam is supported so that it is disposed above a horizontal plane passing through the ends of the carlines or through the eaves edges of the roof sheets. In this manner the inside clear height of the car, as determined by the height of the side, remains the same. Although the invention has been illustrated as being applied to a car roof of the rigid type, that is, one wherein the roof sheets are firmly attached to the carlines, it will be appreciated that the invention is not limited in application to this type of roof as the means for supporting the load lifting beam and the manner in which it is secured to the carlines is wholly independent of the manner in which the roof sheets are carried or supported by the latter. Thus the load lifting device may be applied to other types of roofs, such as the well known flexible type, wherein the roof sheets are permitted to move relatively to the carlines.

I claim:

1. A railway car comprising side plates, carlines secured to the side plates and having oppositely disposed laterally extending flanges, end plates rigidly attached to the said side plates, roof sheets secured to the carlines, and means carried by the laterally extending flanges of the carlines constituting a load lifting device, said means being secured at its opposite ends to the respective end plates and being disposed in spaced relation to the underside of the roof sheets.

2. A railway car having side plates, end plates secured thereto, carlines fashioned with oppositely disposed laterally extending flanges resting upon and secured to the side plates, roof sheets carried by the carlines and extending from side plate to side plate, and means extending longitudinally of the car constituting a load lifting device, said means being secured to the lateral flanges of the carlines in spaced relation thereto.

3. A railway car having side plates, end plates secured thereto, carlines extending from side plate to side plate and rigidly secured thereto, said carlines having oppositely disposed laterally extending flanges, roof sheets carried by the carlines, means secured to the end plates extending longitudinally of the car and constituting a load lifting device, and members carried by the lateral flanges of the carlines and depending downwardly therefrom for supporting said means in spaced relation to the underside of the roof sheets.

4. A railway car comprising side plates, a plurality of carlines extending continuously from one side of the car to the other and respectively secured to said side plates, each of said carlines having oppositely disposed laterally extending flanges, roofing spanning the spaces between the carlines, and means secured to the laterally extending flanges of the carlines constituting a load lifting device, said device extending longitudinally of the car and being disposed in spaced relation to the underside of said roofing.

5. A railway car comprising rigidly connected end plates and side plates, carlines extending continuously from one side of the car to the other and respectively secured to said side plates, each of said carlines having oppositely disposed laterally extending flanges, roof sheets spanning the spaces between the carlines, and means carried by the laterally extending flanges of the carlines constituting a load lifting device, said means being secured at its opposite ends to the respective end plates and being disposed in spaced relation to the underside of the roof sheets.

6. A railway car comprising side plates, carlines extending continuously from one side of the car to the other and respectively secured to said side plates, said carlines being of substantially channel shape and having oppositely disposed laterally extending flanges, roofing spanning the spaces between the carlines, and means rigidly secured to said flanges of the carlines constituting a load lifting device, said device extending longitudinally of the car and being disposed in spaced relation to the underside of the roofing.

7. A railway car comprising rigidly connected end plates and side plates, carlines extending continuously from one side of the car to the other and respectively secured to said side plates, said carlines being of substantially channel shape and having oppositely disposed laterally extending flanges, roof sheets spanning the spaces between the carlines, and means rigidly secured to each of said flanges of the carlines constituting a load lifting device, said device being secured at its opposite ends to the respective end plates and being disposed in spaced relation to the underside of the roof sheets.

8. A railway car having an arched roof comprising side plates, carlines secured to said side plates and having oppositely disposed laterally extending flanges, roofing spanning the spaces between the carlines, and means constituting a load lifting device carried by the laterally extending flanges of the carlines and extending longitudinally of the car adjacent the central portion thereof, said means being disposed in spaced relation to the underside of the roofing and being disposed above a horizontal plane passing through the eaves edges of the latter.

9. A railway car comprising side plates, carlines secured to the side plates and having oppositely disposed laterally extending flanges, roof sheets spanning the spaces between the carlines, and means rigidly secured to the flanges of the carlines constituting a load lifting device extending longitudinally of the car adjacent the central portion thereof, said device being disposed beneath said roof sheets in spaced relation thereto and being disposed above a horizontal plane passing through the ends of the carlines.

10. A railway car comprising side plates, a plurality of inverted channel shaped carlines secured to the side plates, each of said carlines having oppositely disposed laterally extending flanges, roofing spanning the spaces between the carlines, and means extending longitudinally of the car intermediate the ends of the carlines and in spaced relation to the underside of said roofing, said means constituting a load lifting device and being rigidly secured to each flange of each carline whereby the roof structure is rigidified by providing cooperation between the carlines and the individual carlines are strengthened by preventing them from spreading.

11. A railway car having side plates, carlines rigidly secured to said side plates and respectively having oppositely disposed laterally extending flanges, and means extending longitudinally of the car intermediate the ends of the carlines constituting a load lifting device, said means being rigidly secured to the lateral flanges of the carlines in spaced relation thereto.

12. A railway car having side plates, carlines rigidly secured to said side plates and having oppositely disposed laterally extending flanges, a load lifting beam extending longitudinally of the car, and a plurality of means respectively secured to the flanges of each carline for supporting said beam in spaced relation to the latter.

13. A railway car having side plates, carlines respectively secured to said side plates and having oppositely disposed laterally extending flanges roofing spanning the spaces between the carlines, a load lifting beam extending longitudinally of the car, and a plurality of brackets respectively secured to the flanges of each of said carlines for supporting the beam in spaced relation to the roof sheets.

14. A railway car comprising rigidly connected end plates and side plates, carlines extending continuously from one side of the car to the other and respectively secured to said side plates, roofing spanning the spaces between the carlines, a load lifting beam extending longitudinally of the car, a plurality of pairs of brackets respectively carried by the carlines for supporting the beam in spaced relation to the roofing, the brackets of each pair being respectively disposed on opposite sides of the beam and being rigidly secured to the lateral flanges of their associated carline.

15. A railway car comprising side plates, carlines of inverted channel shape rigidly secured to the side plates, each of said carlines having oppositely disposed laterally extending flanges, and load lifting means comprising a plurality of brackets extending transversely of the carlines, each of said brackets being rigidly secured to the flanges of an adjacent carline and forming with said carline a structure of box-like section.

EDWARD H. MATTINGLEY.